United States Patent [19]

Reissmann et al.

[11] Patent Number: 4,717,013

[45] Date of Patent: * Jan. 5, 1988

[54] APPARATUS FOR TRANSPORTING LAYERS OF PAPER SHEETS TO PROCESSING MACHINES

[75] Inventors: Klaus Reissmann; Friedhelm Herrig, both of Hamburg, Fed. Rep. of Germany

[73] Assignee: E.C.H. Will (GmbH & Co.), Hamburg, Fed. Rep. of Germany

[ * ] Notice: The portion of the term of this patent subsequent to Dec. 16, 2003 has been disclaimed.

[21] Appl. No.: 898,958

[22] Filed: Aug. 21, 1986

Related U.S. Application Data

[62] Division of Ser. No. 613,961, May 24, 1984, Pat. No. 4,629,058.

[30] Foreign Application Priority Data

May 27, 1983 [DE] Fed. Rep. of Germany ....... 3319247

[51] Int. Cl.$^4$ ............................................. B65G 47/31
[52] U.S. Cl. ..................................... 198/461; 198/460; 198/575; 198/577; 198/579
[58] Field of Search ......................... 198/425, 460–462, 198/575, 577, 579, 572

[56] References Cited

U.S. PATENT DOCUMENTS

| | | | |
|---|---|---|---|
| 2,883,036 | 4/1959 | Fox et al. ........................ | 198/579 X |
| 3,075,630 | 1/1963 | Fisk ....................... | 198/572 |
| 3,187,878 | 6/1965 | Harrison et al. ..................... | 198/461 |
| 3,485,339 | 12/1969 | Miller et al. .......................... | 198/460 |
| 4,190,146 | 2/1980 | Knuchel ............................... | 198/460 |
| 4,230,218 | 10/1980 | Kunzmann ........................ | 198/461 |
| 4,341,334 | 7/1982 | Bier .................................. | 198/425 X |
| 4,507,908 | 4/1985 | Seragnoli ........................ | 198/460 X |
| 4,518,075 | 5/1985 | Aykut et al. ........................ | 198/460 |
| 4,604,704 | 8/1986 | Eaves et al. ..................... | 198/460 X |

FOREIGN PATENT DOCUMENTS 2098157 11/1982 United Kingdom ................ 198/461

Primary Examiner—Joseph E. Valenza
Assistant Examiner—Lyle Kimms
Attorney, Agent, or Firm—Peter K. Kontler

[57] ABSTRACT

Apparatus for delivering singularized stacks of paper sheets to a packing machine has a first conveyor which intermittently receives groups of several abutting stacks and is intermittently driven by a variable-speed electric motor to advance the groups onto the individual endless bands of a gathering conveyor which serves to accumulate the groups into a row of abutting stacks ready to be singularized and delivered to the packing machine. The bands of the gathering conveyor are normally driven at a constant speed by a prime mover which further drives a first encoder serving to transmit a first signal whenever the bands cover a unit distance. A second encoder generates second signals whenever the motor is on and the first conveyor covers the same unit distance. The motor can also drive the bands at a speed higher than that at which the bands can be driven by the prime mover whenever the speed of the first conveyor exceeds the speed of the bands. The first and second signals are compared in a stage which controls the speed of the motor and can turn the motor off during the intervals of stoppage of the first conveyor, either for the purpose of receiving a fresh group of stacks or for the purpose of segregating one or more stacks from those which are destined for delivery to the first conveyor. During stoppage of the first conveyor for the purpose of receiving a fresh group, the first signals are transmitted to a first counter which then causes the stage to influence the motor so as to drive the first conveyor at a higher than normal speed as soon as the delivery of a group is completed. If the first conveyor is arrested during segregation of one or more stacks, the first signals are stored in a second counter which thereupon influences the stage to establish in the series of singularized stacks gaps at appropriate intervals enabling the packing machine to perform idle cycles.

8 Claims, 1 Drawing Figure

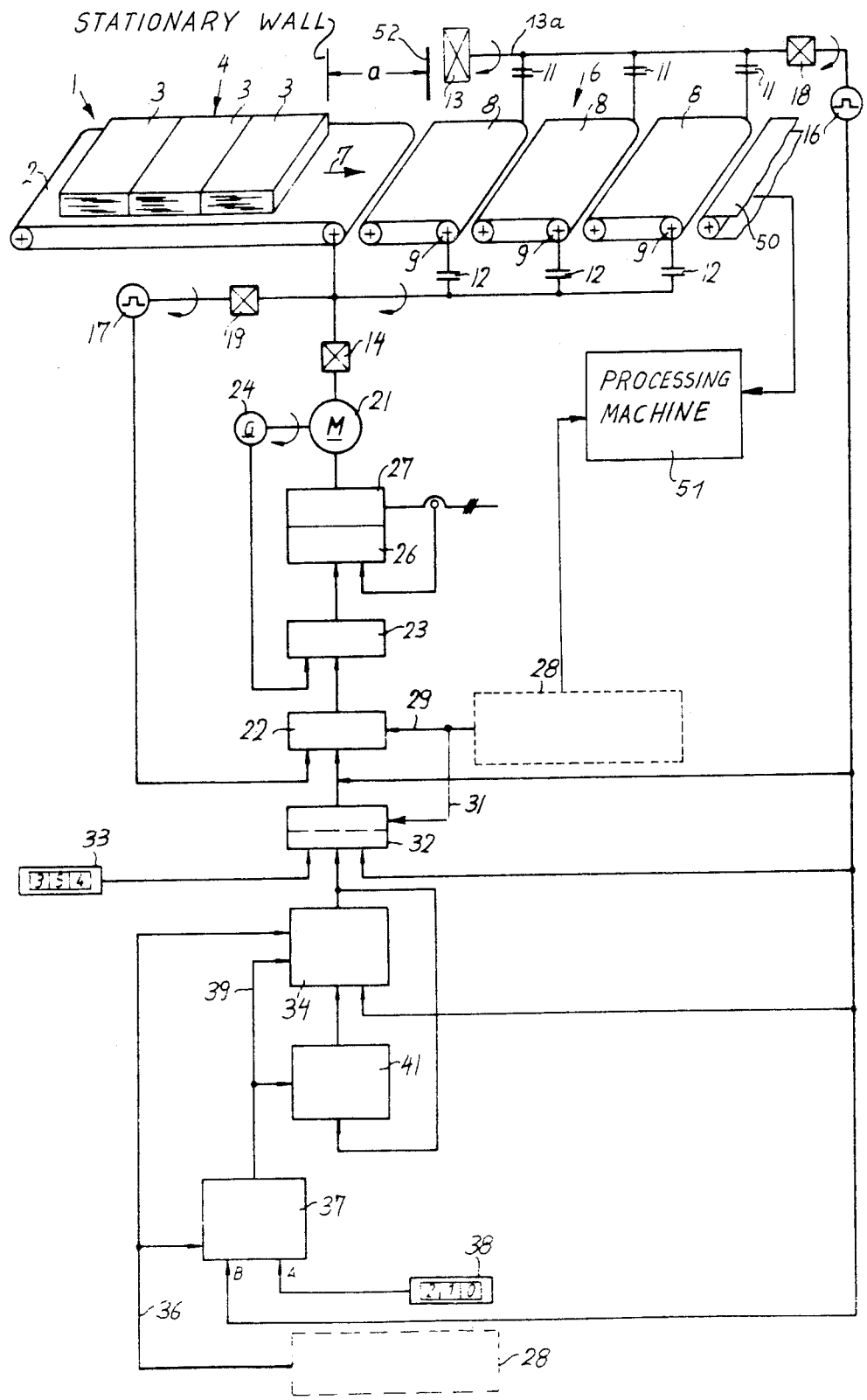

APPARATUS FOR TRANSPORTING LAYERS OF PAPER SHEETS TO PROCESSING MACHINES

CROSS-REFERENCE TO RELATED CASE

The present application is a division of commonly owned copending patent application Ser. No. 613,961 filed May 24, 1984, now U.S. Pat. No. 4,629,058 granted Dec. 16, 1986.

BACKGROUND OF THE INVENTION

The present invention relates to a method of and to an apparatus for manipulating sheets in paper processing plants or the like, especially for manipulating layers or stacks of paper sheets on their way to a packing machine. More particularly, the invention relates to improvements in apparatus for transporting layers or stacks of sheets to a packing or other processing machine in such a way that fluctuations in the rate of delivery of stacks to the apparatus are compensated for before the stacks reach the processing machine so that the rate of admission of stacks into the processing machine invariably conforms to the operating speed of the processing machine and the apparatus compensates for eventual pronounced or less pronounced fluctuations of the rate of admission of stacks thereto, for example, as a result of intermittent delivery of groups of stacks and/or as a result of segregation of unsatisfactory stacks from the remaining stacks.

It is already known to intermittently deliver groups of abutting or closely adjacent stacks to a station which is disposed between the stack forming unit and the processing machine, and to thereupon singularize the stacks of such groups so as to ensure that the processing machine receives properly spaced-apart stacks at a desired rate, namely at a rate conforming to the momentary requirements of the processing machine. To this end, a first conveyor receives groups of stacks from a second conveyor at regular or irregular intervals and is designed to ensure that one outermost stack of the freshly delivered group is moved into abutment with one outermost stack of the previously delivered group. Thus, the first conveyor invariably supports a series of abutting stacks and cooperates with a third (singularizing) conveyor which removes or receives from the first conveyor discrete stacks at the rate which conforms to the then prevailing speed of the processing machine. Reference may be had to the commonly owned copending patent application Ser. No. 374,939, filed May 5, 1982 by Aykut et al., now U.S. Pat. No. 4,518,075 granted May 21, 1985.

U.S. Pat. No. 4,230,218 discloses a modified apparatus for transporting stacks of paper sheets or the like wherein a belt conveyor is driven at a constant speed and cooperates with a belt run having upper and lower belts which are disposed in front of and partially overlap the belt conveyor. The belt run is driven intermittently at a speed varying between zero and a speed exceeding the constant speed of the belt conveyor. The upper and lower belts of the belt run clamp the stacks of paper sheets therebetween and advance the clamped stacks at an elevated speed so as to move the foremost stack into abutment with the last stack on the belt conveyor. The latter cooperates with a singularizing conveyor which converts the group of abutting stacks into a series of discrete stacks advancing toward a packing or other processing machine. The mutual spacing of singularized stacks corresponds to (i.e., it is a function of) the operating speed of the processing machine.

The apparatus of the aforementioned copending application Ser. No. 374,939 deviates from the patented apparatus because it comprises an intermittently driven transverse conveyor preceding a continuously driven gathering conveyor which is followed by the singularizing conveyor. The gathering conveyor comprises several discrete endless bands which are disposed one after the other, as considered in the direction of transport of stacks toward the singularizing conveyor. Each discrete band can be accelerated individually from a lower basic speed to a higher speed so as to ensure that the trailing stack or stacks can be moved nearer to the preceding stacks ahead of the singularizing conveyor. This ensures that the gathering conveyor can accumulate a group of abutting stacks, the foremost one of which advances into the range of the singularizing conveyor whose operation is synchronized with that of the processing machine. In other words, the bands of the gathering conveyor cooperate to compensate for eventual irregularities in the rate of delivery of stacks by the transverse conveyor in order to enable the singularizing conveyor to invariably establish gaps of desired width between the series of discrete stacks.

The aforediscussed apparatus operate satisfactorily under normal circumstances, i.e., the processing machine (normally a packing machine) can receive discrete stacks at a desired rate which enables it to perform the desired operations even if the operating speed varies for any one of a variety of reasons. However, such apparatus cannot ensure predictable delivery of stacks or analogous accumulations of paper sheets or the like to a processing machine if certain stacks must be segregated from other stacks because they exhibit defects or for any other reason. This creates pronounced gaps in the stream of stacks which are delivered to the gathering conveyor so that it would be necessary to effect extremely high acceleration of discrete bands forming part of the gathering conveyor with attendant danger of deformation of the stacks. Alternatively, the path along which the stacks following one or more segregated stacks must be advanced at a higher than average speed is much longer than practical or warranted in a production line for the packing of reams of paper sheets or for the making of steno pads, exercise books and analogous stationery products. In the absence of such undertakings, the processing machine cannot receive stacks at a desired rate; this can cause damage to the processing machine (for example, a packing machine) and/or destruction of stacks which are delivered to the processing machine at inopportune times.

In accordance with another prior proposal which is disclosed in German Offenlegungsschrift No. 27 40 175, the speed of the motor which drives the packing machine is regulated so as to account for the absence of regular or predictable delivery of commodities (biscuits or the like) thereto. This is not a satisfactory solution in production lines which turn out large numbers of packed or otherwise processed goods per unit of time. First of all, repeated acceleration and deceleration of all moving parts in a packing machine for reams of paper sheets or the like entails pronounced wear and greatly reduces the useful life of such machines. Moreover, the stresses upon repeatedly accelerated and decelerated parts are so pronounced that they cannot be accepted in production lines for the making of stationery products or the like which are turned out at the presently required rates.

OBJECTS AND SUMMARY OF THE INVENTION

An object of the invention is to provide a novel and improved apparatus for manipulating stacks or analogous accumulations of paper sheets or the like between a stack forming and a stack processing machine.

Another object of the invention is to provide an apparatus which can deliver commodities to a processing machine at an optimum rate irrespective of fluctuations in the operating speed of the processing machine and/or fluctuations in the rate of delivery of commodities to the unit or units which, in turn, deliver commodities to the processing machine.

A further object of the invention is to provide a novel and improved method of manipulating stacks of paper sheets between a sheet cutter and a packing machine.

An additional object of the invention is to provide a relatively simple and compact apparatus which can fully compensate for intermittent and randomly or regularly recurring deviations of the rate of delivery of commodities thereto as a result of segregation of unsatisfactory commodities or for any other reason.

Still another object of the invention is to provide the apparatus with novel and improved means for regulating the speed of its conveyors.

An additional object of the invention is to provide an apparatus which can be installed in existing production lines as a superior substitute for heretofore known stack gathering and singularizing apparatus.

Another object of the invention is to provide a novel and improved control system for use in conjunction with or for incorporation in the above outlined apparatus.

One feature of the invention resides in the provision of an apparatus for delivering discrete commodities to a processing machine, particularly for delivering spaced-apart stacks of paper sheets to a packing machine. The apparatus comprises a first conveyor (e.g., an endless belt or chain conveyor) which serves to receive groups of commodities at regular or irregular intervals, which must be brought to a standstill whenever it is to receive a fresh group of commodities and which can advance the commodities in a predetermined direction, a gathering conveyor having a plurality of individual conveyors (e.g., discrete endless belt or chain conveyors) serving to accumulate the groups of commodities into a row of closely adjacent commodities by moving the commodities in the aforementioned direction, a singularizing conveyor (which can also include a series of endless belt or chain conveyors) which serves to subdivide the row into a series of spaced-apart commodities, first prime mover means for driving the individual conveyors of the gathering conveyor at a preferably (but not necessarily) constant first speed, variable-speed second prime mover means (e.g., a variable-speed electric motor) which is operable to drive the first conveyor at a plurality of speeds including at least one speed higher than the first speed, clutches or other suitable means for selectively or jointly coupling the individual conveyors of the gathering conveyor to the second prime mover means so that the latter can drive the individual conveyors at a speed exceeding the first speed, first or master encoder means connected with the first prime mover means and serving to generate first signals at a frequency which is proportional to the first speed, second or slave encoder means connected with the second prime mover means and serving to generate second signals at a frequency which is proportional to the speed of the first conveyor, a source of reference signals (e.g., a signal comparing stage) connected with the first and second encoder means and serving to transmit to the second prime mover means operating signals which are indicative of the relationship between the frequencies of the first and second signals, and means for influencing the operating signals in addition to the first and second signals. Such influencing means comprises first and second signal counter means connected with the first encoder means as well as with the source of reference signals and respectively arranged to store first signals on stoppage of the second prime mover means for the purpose of allowing for delivery of a fresh group of commodities to the first conveyor and as a result of segregation of commodities from one or more groups ahead of the first conveyor. Thus, the first counter means is designed to influence the operating signals for the purpose of compensating for interruptions of movement of the first conveyor whenever the latter is to receive a fresh group of commodities, and the second counter means is designed to influence the operating signals for the purpose of compensating for (often long-lasting) interruptions in regular delivery of groups to the first conveyor, for example, as a result of removal of samples from the path along which the commodities move toward the first conveyor, as a result of segregation of one or more defective commodities from such path, or for any other reason which could interfere with the formation of a continuous row of commodities on the gathering conveyor and with proper singularization of commodities by the singularizing conveyor.

The apparatus can further comprise third counter means which is connected with the first encoder means and serves to transmit to the second counter means an output signal in response to reception of a predetermined number of first signals denoting the format of the commodities. The second counter means is then arranged to reduce the number of signals which are stored therein (e.g., to expel some signals) in response to each output signal from the third counter means. A memory can be connected with the second counter means to temporarily store the signals which are expelled from the second counter means in response to reception of an output signal from the third counter means.

The apparatus further comprises a main control unit which controls the operation of the processing machine and, if necessary, the operation of one or more additional machines in a production line including the processing machine. Such control unit can serve to transmit a signal which activates (starts) the first counter means in response to stoppage of the second prime mover means for the purpose of delivery thereto of a fresh group of commodities, and a signal which activates (starts) the second counter means in response to each start of segregation of commodities from their path leading to the first conveyor.

First and second transmissions are respectively interposed between the first and second prime mover means on the one hand and the input elements of the first and second encoder means on the other hand. The first encoder means is preferably arranged to transmit a first signal whenever the individual conveyors cover a unit distance while receiving motion from the first or second prime mover means, and the second encoder means is preferably arranged to transmit a second signal whenever the first conveyor covers such unit distance while receiving motion from the second prime mover means.

The first conveyor can comprise an endless belt or chain conveyor, each individual conveyor of the gathering conveyor can constitute an endless belt or chain conveyor, and each individual conveyor of the singularizing conveyor can constitute an endless belt or chain conveyor.

The apparatus can further comprise a signal emitter which can transmit a signal to the first counter means independently of first signals which are being transmitted by the first encoder means, and another signal emitter can be connected with the second counter means, e.g., to transmit signals denoting the selected or desired format of the commodities.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary diagrammatic partly perspective view of an apparatus which embodies one form of the present invention and serves to deliver singularized stacks of paper sheets to a packing or other processing machine.

DESCRIPTION OF THE PREFERRED EMBODIMENTS

The apparatus which is shown in the drawing comprises a first (group feeding) conveyor 1 having an endless belt 2 whose upper reach receives elongated groups 4 of three neighboring layers or stacks 3 each from a non-illustrated source by way of a delivering conveyor. The latter supplies groups 4 in a direction at right angles to the direction of movement (arrow 7) of the upper reach of the endless belt 2. The discharge end of the group feeding conveyor 1 is adjacent to the receiving end of a second or gathering conveyor 6 including a series of endless bands 8 which serve to ensure that the stacks 3 thereon form a row of abutting stacks ready to be singularized by a third or singularizing conveyor 50 serving to advance a series of singularized stacks to a processing machine 51, e.g., a packing machine for reams of paper sheets. The just described system of conveyors is similar to that disclosed in the aforementioned copending patent application Ser. No. 374,939. The direction of advancement of stacks 3 on the conveyors 1, 6 and 50 is the same (see the arrow 7). The singularizing conveyor 50 can also comprise a series of discrete endless chains or endless belts which are driven at progressively higher speeds.

The drive means for the bands 8 of the gathering conveyor 6 comprises discrete shafts 9 each of which normally receives torque from the variable-speed main prime mover 13 of the production line by way of freewheels 11 which allow the respective shafts 9 to rotate at a speed higher than that dictated by the prime mover 13. In addition, each of the shafts 9 can be driven at a higher speed by a second prime mover 21, such as a variable-speed electric motor, through the medium of a driving unit 14. In other words, the bands 8 are normally driven at the same speed as long as the shafts 9 receive torque from the prime mover 13 via freewheels 11; however, the speed of each shaft 9 can be increased individually in response to engagement of the respective clutch 12 and in response to starting of the motor 21 so as to drive the selected shaft or shafts 9 at a speed which is higher than that of the output element 13a of the prime mover 13. The exact construction of the freewheels 11 and clutches 12 forms no part of the present invention. Each freewheel 11 can comprise a first roller affixed to the respective shaft 9, a second roller which is driven by the output element 13a of the prime mover 13, and a set of sprags or other suitable torque-transmitting elements which are disposed between the two rollers and are effective only as long as the speed of the first roller does not exceed the speed of the second roller. Each of the clutches 12 can constitute a conventional electromagnetic clutch. The prime mover 13 may but need not constitute the main prime mover of the production line or of the processing machine 51; it can constitute a transmission whose output element 13a rotates at a speed which is proportional to the operating speed of the processing machine 51.

The driving unit 14 transmits torque to one pulley of the belt 2 whenever the adjustable prime mover 21 is on. Thus, when a clutch 12 is engaged, the corresponding band 8 is driven at the same speed as the belt 2.

The control circuit (shown only schematically in the drawing) which ensures that the speed of the bands 8 is invariably properly related to the speed of the belt 2 in order to allow for the formation of a row of abutting stacks 3 on the gathering conveyor 6 includes a first signal generator in the form of a master incremental encoder 16 which is driven by the output element 13a of the prime mover 13 by way of a transmission 18, and a second signal generator in the form of a slave incremental encoder 17 which receives motion from the driving unit 14 by way of a transmission 19. Each of the encoders 16, 17 may be of the type LG 433-422-200/13 manufactured by Gelma. Each revolution of the rotor of the encoder 16 results in the generation of a first signal denoting a preselected distance which is covered by the bands 8 of the gathering conveyor 6. Such frequency of signal generation by the encoder 16 is ensured by the provision of the transmission 18 which receives torque from the output element 13a of the prime mover 13, i.e., the frequency of signal generation by the encoder 16 is proportional to the operating speed of the processing machine 51 which is driven by the prime mover 13 or by the unit transmitting motion to the prime mover 13.

The operative connection between the encoders 16 and 17 comprises a source 22 of reference signals whose output can transmit operating signals to the motor 21 through the medium of an RPM regulator 23, a current regulator 26 and a rectifier 27. The motor 21 may be a permanently excited d-c servomotor of the type DMBT 52 Z F8-67 manufactured by Contraves. The source 22 of reference signals may be of the type ECU 101 manufactured by Contraves. The RPM regulator 23, the current regulator 26 and the rectifier 27 can constitute a current rectifying module of the type known as ADB/V (manufactured by Contraves). The operative connection between the encoders 16 and 17 is such that, sooner or later, the rate at which the encoder 17 generates second signals conforms to that of signal generation by the master encoder 16. The transmission 19 transmits motion to the rotor of the encoder 17 when it receives torque from the motor 21 via driving unit 14.

The manner in which the ratio of the speed of the belt 2 to the speed of the bands 8 is established and maintained by the encoders 16 and 17 at one-to-one is as follows: At this time, the problems or complications which arise as a result of intermittent delivery of groups 4 of stacks 3 to the belt 2 are to be disregarded. The shafts 9 for the belts 8 are assumed to be driven by the prime mover 13 via freewheels 11 so that their speed is proportional to the operating speed of the processing machine 51. As a rule, such speed is at least substantially constant. The rotor of the encoder 16 is driven by the transmission 18 at a speed which is proportional to the speed of the output element 13a and shafts 9. The encoder 16 transmits signals at a constant rate to the corresponding input of the source 22 which, at such time, does not receive any signals from the encoder 17 because the motor 21 is assumed to be idle. The source 22 generates a digital signal which is converted into an analog signal prior to transmission to the corresponding input of the RPM regulator 23. The latter compares the analog signal with a signal which denotes the RPM of the motor 21. Such signal is transmitted by a tachometer generator 24, e.g., a device of the type known as 9.5 volt/1000 RPM per minute (manufactured by Contraves). If the "actual value" signal which is transmitted by the tachometer generator 24 deviates from the reference signal which is supplied by the source 22, the RPM regulator 23 transmits an output signal which is processed by the current regulator 26 and rectifier 27 prior to transmission to the servomotor 21. The tachometer generator 24 constitutes a constantly excited d-c generator which is arranged to transmit voltage signals whose intensity is proportional to the RPM of the servomotor 21 within a wide range.

When the servomotor 21 is started in response to an operating signal from the module including the parts 23, 26 and 27, the driving unit 14 begins to drive the rotor of the encoder 17 via transmission 19 and also to drive the input elements of the clutches 12. This means that the encoder 17 begins to transmit pulses to the corresponding input of the source 22 whereby the reference signal at the output of the source 22 changes and the RPM regulator 23 effects a change in the speed of the motor 21. The signal at the output of the source 22, is generated as a result of comparison of first and second signals which are respectively transmitted by the encoders 16 and 17. The regulating operation is terminated when the speed of the belt 2 matches that of the bands 8.

The belt 2 must be arrested whenever the conveyor 1 is to receive a fresh group 4 of stacks 3. To this end, the main control unit 28 of the production line transmits a signal 29 to the corresponding input of the source 22 and a signal 31 to the corresponding input of a counter 32. The signal 29 effects a stoppage of the motor 21 via RPM regulator 23, current regulator 26 and rectifier 27. At the same time, the signal 31 from the main control unit 28 starts the counter 32. The latter may constitute a programmable counter of the type known as PCU 107 (manufactured by Contraves). The counter 32 then counts the number of signals which are transmitted by the encoder 16 while the encoder 17 is idle because the motor 21 has been arrested in response to transmission of signal 29 to the source 22. Thus, the number of signals which are stored in the activated counter 32 is indicative of the distance covered by one or more stacks 3 on the upper reaches of the bands 8 of the gathering conveyor 6 while the conveyor 1 is idle.

When the transfer of a group 4 of stacks 3 onto the belt 2 of the conveyor 1 is completed, the main control unit 28 ceases to transmit the signal 29 so that the motor 21 is started in the aforedescribed manner. The speed of the motor 21 is then determined by signals which are transmitted by the encoder 16 as well as by signals which are transmitted by the counter 32. Still further, the intensity or another characteristic of the signal at the output of the source 22 is determined by the signal which is then transmitted to the counter 32 by a signal enitter 33 whose signal is indicative of the distance a between the rightmost stack 3 of a group 4 of freshly delivered stacks on the upper reach of the belt 2 and the receiving end of the leftmost band 8 of the gathering conveyor 6. The distance a can also denote the distance between the rightmost stack 3 of the freshly delivered group 4 and a stationary wall 52 of the frame of the production line.

The speed of the motor 21 is increased considerably because the source 22 receives from the counter 32 a signal which is indicative of the reference signal from the emitter 33, of the signals which were accumulated by the counter 32 during the interval of stoppage of the motor 21, as well as the signals from the encoder 16. Thus, the belt 2 is rapidly accelerated to an elevated speed and the clutches 12 also drive the bands 8 at a speed which is higher than that at which the bands 8 can be driven by the output element 13a of the prime mover 13 via freewheels 11. The prime mover 13 continues to drive the transmission 18 and the encoder 16 at a speed which is proportional to the operating speed of the processing machine 51.

When the encoder 17 completes the transmission of a certain number of signals to the corresponding input of the source 22 (the encoder 17 is then driven at the high speed), namely a number of signals matching or compensating for those which were stored in the counter 32 during the interval of stoppage of the motor 21, the speed of the motor 21 is reduced and the operation of the improved apparatus returns to normal. Thus, the motor 21 then drives the belt 2 at a speed which matches that of the bands 8 when these bands receive motion from the prime mover 13 via freewheels 11.

The improved apparatus is further designed to compensate for those deviations of operation from normal which are attributable to randomly or regularly occurring segregation of certain stacks 3 ahead of the conveyor 1. To this end, the control circuit of the apparatus comprises a further counter 34 which is activated by the main control unit 28 of the production line in response to activation of the stack segregating or removing device, i.e., in response to segregation of unsatisfactory or otherwise undesirable stacks from the remaining stacks ahead of the conveyor 1. The counter 34 is further connected to the output of the encoder 16 and is started by the unit 28 to receive and store signals from the encoder 16 in response to activation of the segregating device. The signal 36 from the output of the main control unit 28 (shown twice in the drawing) then also activates a format counter or third counter 37 whose output 39 is connected to the corresponding input of the counter 34. The format counter 37 further transmits signals to an auxiliary counter (memory) 41 which is preferably integrated into the counter 34 to form therewith a programmable counter of the aforementioned type known as PCU 107 (manufactured by Contraves). The counter 37 may be a source of reference signals of the type known as DRU (manufactured by Contraves).

The emitter 33 may constitute a thumb wheel switch of the type known as BCD-COD (manufactured by Contraves). The same applies for a similar signal emitter 38 which is connected to one input of the format counter 37.

The counter 37 monitors the width of the formats. The signal from the emitter 38 is indicative of the selected or prescribed width of a stack 3, and such signal is transmitted to the input A of the counter 37. The input B of the counter 37 receives signals from the encoder 16. When the number of signals which are transmitted to the input B of the counter 37 matches the number of signals which are transmitted by the emitter 38, the output 39 of the counter 37 transmits a signal which effects the transfer of a number of signals corresponding to the format width into the auxiliary counter or memory 41. The latter memorizes such signals and makes them available for the next cycle. The remaining signals which are transmitted to the counter 34 are transmitted to the counter 32 to be added to the other signals which are transmitted to the counter 32. In this manner, segregation of stacks from their normal path merely entails an acceleration of the bands 8 and belt 2 to an extent which is above one or more times the number of pulses denoting the width of the format. As regards the remaining difference, there then develop in the stream of singularized stacks 3 gaps having a width corresponding to that between alternate singularized stacks and corresponding signals are also transmitted to the processing machine 51 so that the latter can perform "empty" or idle cycles without damage to its parts and/or to the stacks which are delivered thereafter.

Segregation of stacks from the path leading to the belt conveyor 2 can take place by actuating a suitable segregating device, e.g., a device which removes from such path samples at regular or irregular intervals for the purposes of inspection and comparison with an acceptable sample. Alternatively, or in addition thereto, segregation of stacks 3 from the path leading to the belt conveyor 2 can be effected by an automatic ejector of defective stacks which is provided with suitable monitoring means serving to scan successive stacks for their appearance, accuracy of overlap of the paper sheets and/or other characteristics. Still further, stacks 3 can be removed from the path leading to the conveyor 2 simply by hand. In the absence of the counter 34 and associated components, such segregation of stacks from the path leading to the conveyor 2 could result in damage to the packing machine 51 and/or in destruction of one or more stacks which are delivered to the machine 51 subsequent to an idle cycle, e.g., because the next-following stacks would not be delivered at opportune times for packing.

Signals from the first counter 32 to the source 22 compensate for regularly occurring stoppages of the conveyor 2 for the purpose of receiving fresh groups of stacks 3, and signals from the counter 34 to the source 22 (via counter 32) compensate for normally irregularly occurring and often relatively long stoppages of the conveyor 2 due to segregation of one or more stacks 3 from their path leading toward the conveyor 2, e.g., from a sheet cutting and sheet stacking station. The counter 32 influences the operating signal from the source 22 to the motor 21 in such a way that the speed of the conveyor 2 is increased to a rather high value as soon as the motor 21 is started again subsequent to delivery of a fresh group 4 onto the conveyor 2. On the other hand, the counter 34 influences the operating signal from the source 22 to the motor 21 in a different way, namely so as to ensure that the series of spaced-apart stacks 3 moving from the conveyor 50 to the machine 51 will contain one or more gaps to ensure disturbance-free completion of one or more idle working cycles. This is desirable because, otherwise, the speed of the conveyor 2 in response to a signal from the source 22 upon completion of a segregating operation would have to be increased beyond an acceptable value.

Commonly owned copending patent application Ser. No. 576,192 filed Feb. 2, 1984 by Wolfram Wolf discloses apparatus for diverting or segregating stacks of paper sheets from their normal path toward a packing or other processing machine.

Commonly owned copending patent application Ser. No. 576,193 filed Feb. 2, 1984 by Robert Deutschle discloses an apparatus which serves to deliver groups of stacks at selected intervals to one or more packing or other processing machines.

Commonly owned copending patent application Ser. No. 582,333 filed Feb. 22, 1984 by Alfred Besemann, now U.S. Pat. No. 4,523,502 granted June 18, 1985, discloses an apparatus which serves to accumulate stacks of paper sheets or the like.

Commonly owned copending application Ser. No. 597,760 filed Apr. 6, 1984 by Alfred Besemann, now U.S. Pat. No. 4,572,350 granted Feb. 25, 1986, discloses a different apparatus for segregating or diverting stacks of paper sheets or the like from their path toward a packing or other processing machine.

Each of the above apparatus can be used in conjunction with the apparatus of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of delivering stacks of superimposed sheets to a processing machine, comprising the steps of advancing successive groups of normally abutting stacks by an intermittently driven first conveyor longitudinally along a first path in a predetermined direction and into a second path; conveying successive groups in said direction longitudinally along the second path by a plurality of continuously driven second conveyors; monitoring the speed of groups in each of the first and second paths and generating first and second signals respectively denoting the distance covered by the groups in the corresponding paths per unit of time; comparing the first and second signals and generating third signals denoting the differences between the first and second signals; and utilizing the third signals to drive the first conveyor so that the distance between the rearmost stack of the group in the second path and the foremost stack of the group in the first path is zero or a whole multiple of the length of a stack in said direction.

2. A method according to claim 1, wherein said utilizing step includes regulating the RPM of the prime mover for the first conveyor.

3. A method according to claim 1, wherein the first and second signals are generated by incremental encoders.

4. A method according to claim 1, further comprising the step of singularizing the stacks of successive groups in the second path.

5. Apparatus for cyclically delivering stacks of superimposed sheets to a processing machine, such as a packing machine, comprising an intermittently driven first conveyor arranged to receive groups of normally abutting stacks and to advance the stacks longitudinally in a predetermined direction; a continuously driven gathering conveyor arranged to receive successive groups from the first conveyor and to accumulate the stacks of the groups into a row of closely adjacent stacks, the gathering conveyor comprising a plurality of conveyors which are disposed on behind the other in said direction; first prime mover means for driving the conveyors of the gathering conveyor at a substantially constant speed; adjustable second prime mover means operable to drive the first conveyor; means for generating first signals denoting the distance covered by the gathering conveyor per unit of time when driven by the first prime mover means; means for generating second signals denoting the distances covered by the first conveyor per unit of time; and means for adjusting said second prime mover means in response to said signals so that the distance between the rearmost stack of a group on the gathering conveyor and the foremost stacks of the next-following group on the first conveyor is zero or a whole multiple of the length of a stack in said direction.

6. Apparatus according to claim 5, wherein the adjusting means comprises means for comparing the first and second signals and for generating third signals denoting the difference between the first and second signals.

7. Apparatus according to claim 6, wherein the adjusting means comprises a device arranged to change the speed of the second prime mover means in response to the third signals.

8. Apparatus according to claim 5, wherein at least one of the signal generating means comprises an incremental encoder.

* * * * *